Aug. 13, 1935.  R. S. TROTT  2,011,235
ENGINE MOUNTING
Original Filed Nov. 24, 1928   3 Sheets-Sheet 1
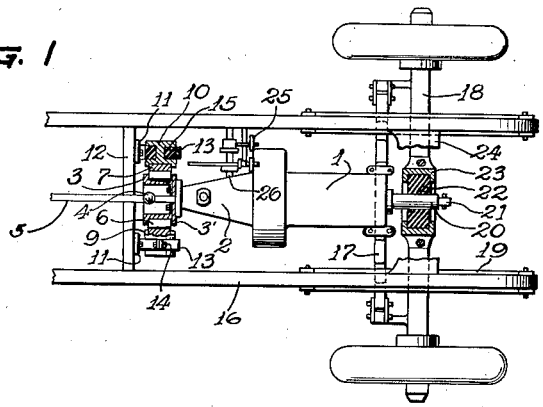
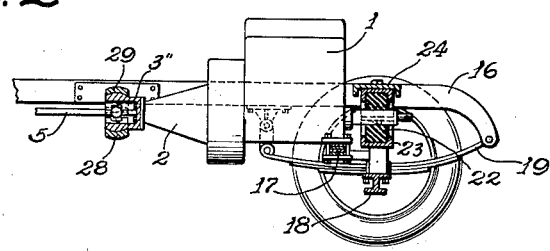
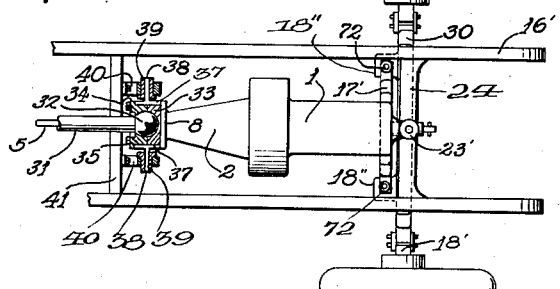
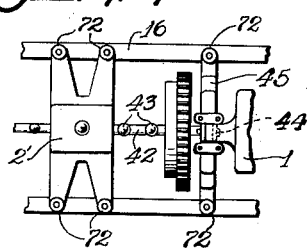
Inventor
Rolland S. Trott
Attorney Aug. 13, 1935.  R. S. TROTT  2,011,235
ENGINE MOUNTING
Original Filed Nov. 24, 1928   3 Sheets-Sheet 2
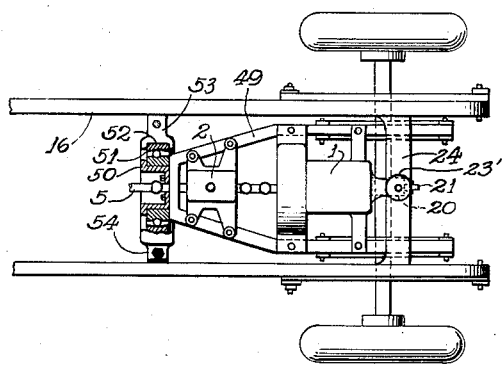
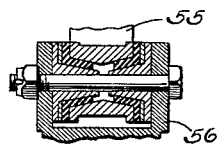
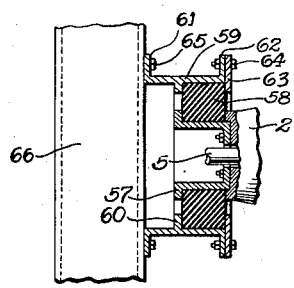
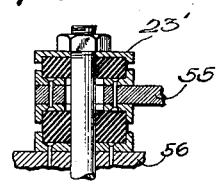
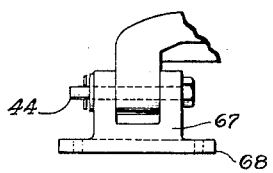

Aug. 13, 1935.　　　R. S. TROTT　　　2,011,235
ENGINE MOUNTING
Original Filed Nov. 24, 1928　　3 Sheets-Sheet 3

Inventor
Rolland S. Trott

Attorney

Patented Aug. 13, 1935

2,011,235

UNITED STATES PATENT OFFICE 2,011,235

ENGINE MOUNTING

Rolland S. Trott, Denver, Colo.

Original application November 24, 1928, Serial No. 321,634. Divided and this application May 21, 1932, Serial No. 612,809

19 Claims. (Cl. 180—64)

This invention relates to engine mountings for engines having force and torque cushioning movements with respect to the support or frame upon which they are mounted and is a division of my application for patent on Automotive vehicles filed on November 24, 1928, Serial No. 321,634, now Patent No. 1,890,871, December 13, 1932.

The object of this invention is to provide a power plant or engine unit mounting in which there will be no great differential movement between the body or frame and the power plant and in which the engine sensation will be largely eliminated from the body and the frame.

A further object is to provide such a power plant mounting in which the power plant is partly supported in a manner that can transmit substantially no torque reaction to the frame.

A further is to provide such a mounting in which the power plant thereof is mounted upon the frame and is connected to the axle in such a manner as to transmit substantially all torque reaction from the power plant to the axle directly and without said reaction passing to the axle through the body or through the frame upon which the body is mounted.

A further object is to provide a power plant or engine unit mounting in which the power plant is mounted adjacent its ends upon the frame and in which a resilient torque transmitting and weight supporting connection extends between the engine unit and an axle of the vehicle.

I attain the objects sought in this invention by providing:—1st, a spring connection extending directly between the engine unit and the front axle which spring connection may carry some of the weight of the engine and transmits the torque to the axle from the engine and is adapted to form a torsional cushion to resiliently maintain the position of the engine against the torque reaction, and 2nd, pivotal mounting means between each end of the engine unit and the frame adapted to permit the torsional cushioning movement of the engine unit and adapted to carry at least a part or all of the weight of the engine unit.

In my application Serial No. 321,634, of which this is a division, the weight of the front of the engine unit is normally carried by an engine spring mounted upon the front axle whether a normally inactive cushion to limit the relative movement of the frame and the front of the engine unit is used or not. In this application, the front of the engine unit is normally supported either by a rubber mounting on the frame or by the engine spring mounted on the axle, or by both rubber mounting and engine spring, but where the weight is carried by the spring, the engine unit is positively connected by the front mounting to the frame, so that there is a mounting on the frame without any predetermined free movement relative to the frame as in my above referred to application.

Where the rubber mounting on the frame normally carries the entire weight of the front of the engine unit, the engine spring to the front axle carries normally no weight and merely acts as a torque connection. This arrangement provides for any desired range between these two extremes merely by changing the height or strength of the engine spring which is mounted on the front axle. I have tried both extremes, and I have also tried a construction in which twenty-five per cent of the weight of the front of the engine was carried by the front mounting on the frame and seventy-five per cent carried by the engine spring. I have also tried carrying seventy-five per cent on the frame and twenty-five per cent on the engine spring. In my experiments I have tried several other proportions in addition to those mentioned, including an approximate equal distribution of the weight of the front of the engine unit upon the frame and engine spring.

Further variation may be provided by changes in the engine spring. That is, with the front of the engine carried by the mounting on the front of the frame, a too flat or too low engine spring will put an additional resilient downward pressure upon the front of the frame, or on the other hand where the engine spring is carrying the entire weight of the front of the engine unit, a too high spring will enable part of the weight of the frame to be carried by the engine spring in addition to the entire weight of the engine.

In any case however, it is evident that the use of the front rubber mounting precludes perfectly free movement of the front of the engine unit with respect to the frame, regardless of the positive or negative loads which may be carried by the engine spring. This will result in decreased relative movement of the frame and the front of the engine unit which has definite advantages, especially over excessively rough roads, relative to the various connections to the engine unit and the movement of the transmission of the engine unit with respect to the frame.

This construction is fully explained below and shown in the drawings, in which:—

Fig. 1 is a fragmentary plan view and partial section of a unit power plant construction, with open propeller shaft, semi-elliptic front springs, a roller bearing mounted in rubber for the support of the rear of the power plant, a resilient mounting upon the frame, and a spring carried by the front axle for the support of the front of the power plant;

Fig. 2 is a side view and partial section of the same but showing a rear power plant support composed of a plan globular bearing, a front power plant support composed of a resilient mounting upon the frame, and also a spring carried by the front axle;

Fig. 3 is a fragmentary plan view of a modified form in which the frame and the front of the unit power plant are mounted on the front axle by individual cross springs, and the front and rear of the power plant are mounted upon the frame by resilient pivotal mountings;

Fig. 4 is a detail showing the transmission mounted on the frame and separate from the engine, the engine at the rear having a spring mounted pivotal support;

Fig. 5 is a fragmentary plan view in which the engine and transmission are separated and are mounted upon a sub-frame, which sub-frame is mounted at the rear upon the frame of the vehicle by a universal ball bearing, and at the front is mounted upon semi-elliptic springs which are attached directly to the front axle and upon a resilient mounting upon the frame;

Fig. 6 is a detail showing a rubber mounting construction, to be used and adapted for mounting the power plant or any part thereof on either frame or axle;

Fig. 7 is a detail showing a modified form of spring or power plant rubber mounting;

Fig. 8 is a detail showing a modified form of mounting of the power plant on the frame;

Fig. 9 is a detail of the rear pivot mounting of Fig. 4;

Figure 10:
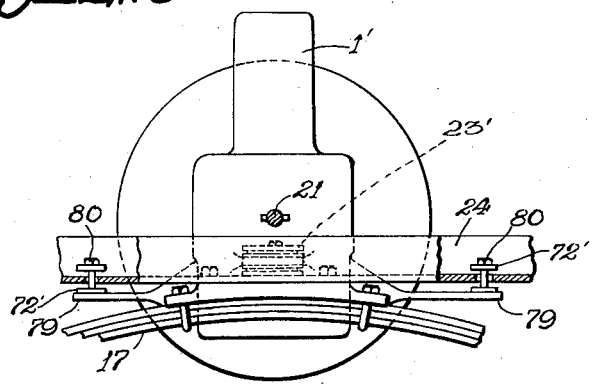
Fig. 10 is a detail showing a modified form of a front mounting upon the frame.

It will be seen that most of the drawings contain exaggerations in part, for the sake of clearness.

In Figure 1, the engine 1 has the transmission 2 integral therewith, forming a unit power plant. To the rear end of the power plant is attached the mounting bracket 3, surrounding and concentric with the universal joint 4, to which is connected the propeller shaft 5. Between the mounting bracket 3 and the transmission 2 is clamped the plate 3'.

The bracket 3 forms the inner track of a roller bearing having rollers 6 and outer track 7. The plate 3' acts to retain the rollers 6.

The flanged support ring 9, provided with the flanged support pins 10, receives the outer track 7, but may be made integral therewith if desired.

The frame brackets 11, properly attached to the frame cross member 12, are each provided with a cap 13, secured thereto by the bolts 14, and thereby forming an apertured end for the bracket.

The flanged support pins 10 are surrounded by the cushion members 15, composed of proper cushioning material such as rubber, and supported in the frame brackets 11.

It will be seen that this method of mounting the rear end of the power plant, permits torsional action of the power plant with respect to the frame, and because of the free movement provided by the roller bearing mounting, the torsional movement of the power plant can impart no vibration to the frame 16 that is due to torque reaction.

And the cushion supplied by the members 15 permits slight distortions of the power plant with respect to the frame without strain, noise, or shock, and will tend to absorb any vibration due to lack of perfection in the construction of the power plant.

The front end of the power plant is supported on the cross spring 17, which is mounted on the front axle 18 in any proper manner, either entirely metallic as shown, or through rubber or other cushioning means, forms of which are illustrated in Figures 6 and 7.

The spring 17 is to be properly proportioned to its load, with respect to the springs 19 which support the frame 16 and their proportioning with respect to their load, so that when the vehicle encounters a road shock, the frame 16 and the power plant will flex their respective springs substantially the same amount and there will be as little differential movement as possible between them. The lateral movement of the front portion of the engine unit is permitted by the action of the cushion members 15 of the rear mounting, and is taken care of by a flexible connection between clutch pedal 25 and clutch shaft 26.

The front end of the power plant is also supported by the mounting 22 upon the cross member 24 of the frame. The mounting 22 is preferably composed of a rubber cushion supported in a housing 23, which is securely attached to the cross member 24 of the frame. The starting crank bracket 20, which is concentric with the crank shaft 21 of the engine extends through and is surrounded by the rubber mounting 22. A variation of the mounting 22 is illustrated in detail in Figure 8.

The mountings at the front and rear ends of the power plant or engine unit are adapted to carry if necessary substantially the entire weight thereof and are reliable enough so that the power plant unit will be securely attached to the support at these two points in such a manner as to permit pivotal movement of the unit of an approximately orbital nature with respect to the frame or support without any question arising as to the security and safety of the mounting. The pivotal movement will be about a longitudinal axis extending approximately throughout the entire length of the engine unit but at the front the axis will extend in the region of the crank-shaft, depending somewhat upon the relative amount of weight carried by the cushion mounting and by the spring.

Each explosion of the engine which tends to make it revolve about its crankshaft will be resiliently cushioned by the action of the spring 17, the slight movement of the power plant during this cushioning being permitted by the rollers 6, so that no torque effect will be transmitted to the frame 16.

When road shocks are encountered, the spring 17 will act in unison with the frame springs 19, and if for any reason there is a tendency for the movement of the power plant to be different from that of the frame 16, the action of the mounting 22 will substantially prevent such differential movement.

It will be seen that if the engine and power plant as a whole are well built and properly balanced, and the springs 17 and 19 are of exactly the right strength and performance, the load, if any, carried by the mounting 22 will remain substantially constant during the action of the springs 17 and 19.

All this, however, requires such an exacting set of conditions that they are likely to be met with only in a small percentage of constructions so that some variation in the load carried by the mounting 22 may be naturally expected.

With such a double pivoted construction upon the frame, if it is found that the torque effect of the engine explosions tends to raise or lower the front end of the power plant, and thus put load upon the pivotal construction, it may be found advantageous to have the mounting normally put a load of opposite direction on the pivotal mounting so that when the engine is pulling the load will be substantially removed therefrom.

It will be seen that though the power plant may be carried wholly or in part by the frame, the torque reaction upon the engine when it turns the propeller shaft is carried by the front axle directly, either entirely, or nearly so, or in a varying amount depending upon the torque-transmitting ability of the frame mountings.

The longitudinal position of the rear power plant support may, of course, be changed as desired, but I prefer it to be aligned and concentric with the universal joint at the front end of the propeller shaft for the reason that such position permits both power plant and propeller shaft to move independently of each other. That is, the propeller shaft may move due to action of the rear springs of the vehicle, without affecting the power plant, and the power plant may move slightly, due to differential movement between the frame and the front of the power plant, without affecting the propeller shaft.

The vertical position of the rear power plant mounting, I prefer to be as shown in Figure 1, that is, concentric with the crankshaft, for the reason that the torque of the engine tends to rotate it about its crankshaft as a center, and such concentric mounting will generally give better results.

But, as shown in Figure 4, both the longitudinal and the vertical position of the rear support may vary, if desired, to better conform to the general construction of the power plant or engine in question.

In the construction shown in Figure 2, the mounting bracket 3" carries the inner member of a ball and socket mounting bearing. The outer member of this joint is composed of a cross piece 28 which is secured to the frame 16, and a cap 29, which is properly secured to the piece 28. This construction is cheaper and simpler than that shown in Figure 1, but provides the same action except for the lack of cushion and the additional friction of the plain surfaces.

In the construction shown in Figure 3, the front of the power plant is mounted on the front axle 18' by the cross spring 17', and the frame 16' is mounted on the front axle by the cross spring 30.

Cushion mountings 72 which may be similar to that shown in Figure 7 are illustrated for connecting the spring 17' to the axle 18' by mounting plates 18". The front of the power plant is also mounted upon the frame member 24 by the cushion mounting 23'. The mounting 23' may also be similar in construction to that shown in Figure 7.

The propeller shaft 5 is enclosed in a torque tube 31, which has a ball 32 adapted to fit inside the ball housing of the power plant composed of the ball bracket 33 and the ball cap 34, held together by the cap screws 35, which engage the plate 8 of the transmission 2.

The support yoke 37 is divided into two halves supported by central support pins 38 and the flanged bushings 39 which act to hold the two halves together about the ball housing.

The frame brackets 40 on the cross frame member 41 journal the flanged bushings 39 and the support yoke 37 and support the rear end of the power plant.

In the construction shown in Figure 4, the transmission 2' is mounted directly upon the frame 16, separate from the engine 1. The engine 1 is connected to drive the transmission through the shaft 42, which is provided with two universal joints 43. The engine 1 is supported at the rear upon the trunnion pin 44, which is located directly over the crankshaft, and is mounted upon the cross spring 45, which is in turn mounted upon the frame by the rubber mountings 72.

Figure 11:
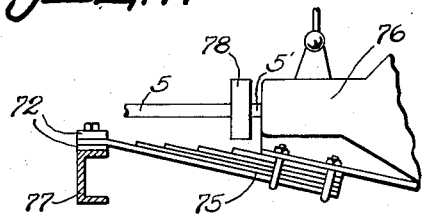
Fig. 11 is a detail of a rear mounting on the frame.

If desired a rubber mounting, two forms of which are shown in Figures 6 and 7, may be used in place of the trunnion pin construction, and a cross frame member such as shown at 77 in Figure 11 may be used in place of the spring 45.

These constructions, while I do not consider them as perfect in some ways as those having mountings concentric with the crankshaft, will with proper design, come quite close to giving the same results as obtained by the other constructions, since the effect of the lack of concentricity of the mounting may be to some extent taken up by the flexibility of the spring 45 or of the rubber mounting, or by other factors in the vehicle.

The mounting of the transmission directly upon the frame, while it will eliminate the relative movement of the frame and the gear shift lever, will not tend to reduce gear noises in low and intermediate gears. For this reason I have shown the transmission mounted on the frame by the rubber mountings 72.

In Figure 5, the construction in effect is the same as in the unit power plant construction, since the engine 1 and transmission 2 are mounted upon the sub-frame 49 and with it form a unit power plant which may be mounted at both ends by any of the various other constructions shown as well as by the construction shown in Figure 5.

The mounting bracket 50 mounts the inner track of the standard type of universal ball bearing 51, the outer track of which is mounted in the retainer 52, formed in the cross frame member 53; the bearing 51 being held in place by the cap 54, which is properly secured to the member 53.

The front of the engine unit is mounted upon frame member 24 by the mounting 23', which is similar in construction to that shown in Figure 7.

Figure 6 shows one form of rubber mounting, which may be used between the frame and the rear cross member which supports the rear of the power plant, or between the engine and the front supporting spring, or between the engine spring and the front axle, or the frame springs and the frame, or between the frame springs and the front axle, all depending upon the particular constructions employed and the judgment of the designer.

Figure 7 shows another form of rubber mounting, to be used in the same manner as the form shown in Figure 6. The parts to be connected by this mounting are represented by the members 55 and 56.

In Figure 8, the bracket 57 is centered on the power plant, which acts to position the rubber cushion 58 on the bracket 57. The support 59 is provided with the flanges 60, 61 and 62. The plate 63, attached to the flange 62 by the bolts 64, positions the cushion 58 in the support 59 and against the flange 60. The bolts 65 through the flange 61, attach the support 59 to the frame cross member 66.

The cushion 58 provides a resilient mounting for the power plant, which not only cushions against horizontal or vertical shocks, but also permits the slight rotary movement of the power plant due to the resilient cushioning of the torque reaction as explained elsewhere.

In Figure 9 the bracket 67 is to be mounted by its flange 68 upon the cross spring 45 shown in Figure 4 and properly attached thereto. The movement due to cushioning the torque reaction is provided by the pin 44 shown in Figure 9.

In Figure 10, the front of the engine unit is shown as carried by the spring 17 upon the axle (not shown) and is also mounted upon the frame cross member 24 by the rubber mounting 23' which is similar in construction to the mounting shown in Figure 7.

In Figure 11 the rear portion 76 of the power plant is mounted upon the leaf spring 75 which in turn is mounted by the rubber mounting 72 upon the cross member 77 of the frame. The propeller shaft 5 is connected to the drive shaft 5' of the transmission of the engine unit through the universal joint, which in this case is concealed by the brake drum 78. The combination of the actions of the spring 75 and of the rubber mounting 72 will not only tend to cushion vertical forces but will in all ways accommodate for the movements provided by the other end of the engine unit.

I am aware that under some conditions it may be advantageous to position the pivotal mounting or mountings of the engine unit to one side of the center of weight, so as to tend to oppose the torque reaction of the engine unit by off-center weight in its mountings; or the off-center weight may be such as to operate against the springs in the same direction as the torque reaction acts upon the engine, so as to give the spring which resiliently opposes the torque reaction an initial load similar to that imposed by the torque reaction.

But, in any case, I consider all such variations and changes to be but mechanical equivalents whereby the engine unit is mounted at two points upon the frame and connected direct to the axle.

It is, of course, understood that the automotive vehicle is to be provided with generator, starter, ignition and cooling equipment, as well as gasolene tank and connections, steering gear mounted on the frame and connections, throttle and spark controls adapted to be unaffected by the relative movement of the engine unit with respect to the frame, battery and connections, muffler mounted on the engine, or on the frame and provided with a flexible exhaust pipe or connections, brake equipment and control, instruments and connections, hood, body, running board, pans, radiator and connections and in fact with all the usual appointments as well as those especially required by my invention and its combination with the rest of the vehicle. But, the greater part of all the above elements are omitted from the drawings for the sake of clearness.

Therefore, I do not wish to confine my protection narrowly to the exact constructions described and illustrated, but what I claim as new and desire to protect by Letters Patent, is as follows:—

1. In an automotive vehicle having a frame, the combination of an engine unit, means mounting one end of the engine unit and comprising means carried by the frame and resilient means carried by a part of the vehicle other than the frame, said mounting means permitting orbital and substantially pivotal movement of that end of the engine unit with respect to the frame, and means mounting the other end of the engine unit upon the frame and accommodating for the movements permitted by the first named end of the engine unit.

2. In an automotive vehicle having a frame, the combination of an engine unit, a transversely disposed spring attached to one end of the engine unit, mounting means movably mounting the said spring upon a part of the vehicle other than the frame, mounting means adjacent said spring mounting the engine unit upon the frame and permitting orbital and substantially pivotal movement with respect to the frame, and mounting means mounting the other end of the engine unit upon the frame and accommodating for the movement permitted at the first named end of the engine unit.

3. In an automotive vehicle having wheel and axle means, a frame, and springs mounting the frame on the wheel and axle means, the combination of an engine unit, a transversely disposed spring attached to one end of the engine unit, mounting means movably mounting the spring upon one of said wheel and axle means, mounting means adjacent the said spring and carried by the frame mounting that end of the engine unit upon the frame and providing orbital and substantially pivotal movement with respect to the frame, and mounting means mounting the other end of the engine unit and accommodating for the movements provided for the first named end of the engine unit.

4. In an automotive vehicle having a frame, the combination of an engine unit, transversely disposed resilient means attached to one end portion of the engine unit and to a part of the vehicle other than the frame, mounting means adjacent said resilient means mounting said end portion of the engine unit upon the frame, and permitting orbital and substantially pivotal movement, and mounting means adjacent the other end of the engine unit mounting the engine unit on the frame and accommodating for the movements of the first named end of the engine unit.

5. In an automotive vehicle having wheels and axles, the combination with a frame and an engine unit, of means mounting an end portion of the engine unit on the frame, and means mounting the opposite end portion of the engine unit on the vehicle, said last-mentioned mounting means having weight supporting connections with the frame and an axle, and means mounting the frame on the axles independent of said engine mounting means.

6. In an automotive vehicle having wheels and axles, the combination with a frame and an engine unit, of means movably mounting an end portion of the engine unit on the frame, and means movably mounting the opposite end portion of the engine unit for orbital movement responsive to impulses incident to the operation of the engine unit, said last-mentioned mounting means having weight supporting connections with the frame and an axle.

7. In an automotive vehicle having wheels and axles, the combination with a frame, and an engine unit, of means movably mounting an end portion of the engine unit on the frame, and means mounting the opposite end portion of the engine unit for orbital movement responsive to impulses incident to the operation of the engine unit, said last-mentioned mounting means having a cross-spring supported by an axle and fixedly connected to the engine unit and having a resilient non-metallic positive connection between the engine unit and the frame.

8. In an automotive vehicle including axles, springs, frame and engine unit, means adjacent one end of said unit connecting the engine unit to the frame substantially incapable of transmitting engine torque reaction from the engine unit to the frame, and resilient means forming the sole connection between the engine unit and one of the axles and adapted to resiliently transmit substantially the entire engine torque reaction of the engine unit to the said axle, and means provided with compressible material mounting the other end of said engine unit upon the frame and limiting its movement with respect thereto and substantially incapable of transmitting torque reaction to the frame.

9. In an automotive vehicle including axles, springs, frame and engine unit, means mounting the engine unit adjacent one of its ends upon the frame substantially incapable of transmitting the engine torque reaction from the engine unit to the frame, resilient means forming the sole engine connection between one of the axles and the adjacent end of the engine unit and adapted to resiliently transmit substantially the entire engine torque reaction of the engine unit to the said axle, and means substantially incapable of transmitting engine torque reaction spaced from the first mounting means and provided with compressible material, mounting the engine unit upon the frame and limiting its movement thereon.

10. In an automotive vehicle including axles, springs, frame and engine unit, a transversely extending spring, means mounting said spring upon one of the axles, means attaching the engine unit to said spring, two spaced mounting means mounting the engine unit upon the frame and permitting substantially pivotal movement of the engine unit with respect to the frame, one of said mounting means being provided with compressible material and adapted to limit that end of said unit in its movements with respect to the frame.

11. In an automotive vehicle including at least one axle, a frame, and engine unit having a longitudinally extending drive shaft, a transversely extending spring, means mounting said spring upon the axle, means mounting the engine unit upon said spring, and means mounting the engine unit at two separated points upon the frame and permitting substantially pivotal cushioning movement of the engine unit with respect to the frame, the mounting at one of said points being provided with compressible material.

12. In an automotive vehicle having a frame structure, the combination of an engine unit having inherent oscillation about a longitudinal axis extending approximately throughout the length of the engine unit, means mounting an end portion of the engine unit on the frame structure and permitting approximately universal movement of said engine unit while holding said end portion against substantial lateral movement, and non-metallic resilient means mounting and supporting another longitudinally spaced portion of the engine unit on the frame structure and constructed and arranged to permit restrained freedom of movement of the adjacent portion of the engine unit approximately in any direction in response to the impulses incident to the operation of the engine unit.

13. In an automotive vehicle having a frame structure, the combination of an engine unit having inherent oscillation about a longitudinal axis extending approximately throughout the length of the engine unit, means mounting an end portion of the engine unit on the frame structure and permitting approximately universal movement of said engine unit while holding said end portion against substantial lateral movement, and non-metallic resilient means mounting and supporting another longitudinally spaced portion of the engine unit on the frame structure and constructed and arranged to permit restrained freedom of movement of the adjacent portion of the engine unit approximately in any direction in response to the impulses incident to the operation of the engine unit, said non-metallic resilient mounting means being so constructed as to locate the axis of oscillation of the engine unit sufficiently close to parallel with the crankshaft of the engine unit for torque cushioning oscillation of the engine unit.

14. In an automotive vehicle having a frame structure, the combination of an engine unit having inherent oscillation about a longitudinal axis extending approximately throughout the length of the engine unit, means mounting an end portion of the engine unit on the frame structure and permitting approximately universal movement of said engine unit while holding said end portion against substantial lateral movement, and non-metallic resilient means mounting and supporting another longitudinally spaced portion of the engine unit on the frame structure and constructed and arranged to permit restrained freedom of movement of the adjacent portion of the engine unit approximately in any direction in response to the impulses incident to the operation of the engine unit, said non-metallic resilient mounting means being so constructed as to locate the axis of oscillation of the engine unit sufficiently close to parallel with the crankshaft of the engine unit for torque cushioning oscillation of the engine unit, and means for stabilizing the engine unit on the mounting means.

15. In an automotive vehicle having a frame structure, the combination of an engine unit having inherent torque cushioning oscillation about a longitudinal axis, means mounting an end portion of the engine unit on the frame structure and permitting approximately universal movement of said end portion while holding said end portion against substantial lateral movement, and resilient means mounting and supporting the opposite end portion of the engine unit on the frame structure and so constructed and arranged as to permit orbital movement of the engine unit at least at that end in response to the impulses incident to the operation of the engine unit, said resilient mounting means permitting yieldingly opposed oscillation of the engine unit.

16. In an automotive vehicle having a frame structure, the combination of an engine unit having inherent oscillation about a longitudinal axis extending approximately throughout the length of the engine unit, means mounting the rear end portion of the engine unit on the frame structure and permitting approximately universal movement of said engine unit while holding said end portion against substantial lateral movement, and front mounting means, mounted on the vehicle for supporting the front end portion of the engine unit and for opposing the oscillation thereof, said front mounting means comprising non-metallic resilient means mounting and supporting the front end portion of the engine unit on the frame structure and constructed and arranged to permit restrained freedom of movement of the adjacent portion of the engine unit approximately in any transverse direction in response to the impulses incident to the operation of the engine unit.

17. In an automotive vehicle having a frame, the combination of an engine unit, means mounting one end of the engine unit and comprising means carried by the frame and resilient means carried by a part of the vehicle other than the frame, said mounting means permitting orbital and substantially pivotal movement of that end of the engine unit with respect to the frame and resiliently opposing said pivotal movement, and means mounting the other end of the engine unit upon the frame and accommodating for the movements permitted by the first named end of the engine unit.

18. In an automotive vehicle having a frame structure, the combination of an engine unit having inherent oscillation about a longitudinal axis extending approximately throughout the length of the engine unit, means mounting the rear end portion of the engine unit on the frame structure and permitting approximately universal movement of said engine unit while holding said end portion against substantial lateral approximately horizontal movement, and resilient weight supporting and torque resisting front mounting means supporting the front portion of the engine unit on the vehicle and adapted to resiliently cushion the front end of the engine unit against a tendency to lateral movement, said front mounting means including non-metallic resilient material of substantial thickness interposed between the engine unit and the frame.

19. In an automotive vehicle having a frame structure, the combination of an engine unit mounted to have torque cushioning oscillation about a longitudinal axis extending approximately throughout the length of the engine unit, means mounting the rear end portion of the engine unit on the frame structure and permitting approximately universal movement of said engine unit while holding said end portion against substantial movement in any direction transverse to said axis, and resilient weight supporting and torque resisting front mounting means supporting the front portion of the engine unit on the vehicle, said weight supporting and torque resisting front mounting means being adapted to resiliently cushion the front end portion of the engine unit against a tendency to horizontal and other movements transverse to said axis, said front mounting means including non-metallic resilient material of substantial thickness interposed between the engine unit and the frame.

ROLLAND S. TROTT